April 25, 1950 B. KRAVITZ 2,505,554
AUTOMOBILE FLOOR MAT
Filed April 24, 1948 2 Sheets-Sheet 1

INVENTOR.
BEN KRAVITZ
BY Morton S. Brockman

April 25, 1950     B. KRAVITZ     2,505,554
AUTOMOBILE FLOOR MAT
Filed April 24, 1948     2 Sheets-Sheet 2

INVENTOR.
BEN KRAVITZ

Patented Apr. 25, 1950

2,505,554

UNITED STATES PATENT OFFICE 2,505,554

AUTOMOBILE FLOOR MAT

Ben. Kravitz, University Heights, Ohio, assignor to Anchor Rubber Products, Inc., Cleveland, Ohio Application April 24, 1948, Serial No. 23,056

10 Claims. (Cl. 154—49)

This invention relates to floor mats and particularly to mats for automobile floors having a longitudinally extending drive shaft ridge.

Conducive to a better understanding of this invention, it may be well to point out that conventional automobile floors have an inclined laterally extending portion adjacent the motor compartment upon which the accelerator and other operating pedals are positioned. A ridged or convex tunnel extending along the median line of the floor from the motor to the rear axle forms a cavity under the floor for the drive shaft. The floor is usually covered with a mat of flexible material such as rubber backed with felt which acts as an insulator to keep out heat, cold and dust. If a conventional flat mat is used to cover the floor, an unsightly bulge is created at the junction of the ridge and the inclined portion of the floor. Specially molded mats, pre-shaped to fit the inclined portion of the ridge, provide a wrinkle free covering but require curved molds for their production and are therefore very expensive.

The primary object of this invention therefore is to provide a flat floor mat for automobiles that will hug the ridge and follow the horizontal and inclined contour of the floor boards without wrinkling or bulging.

Another object is to provide a die cut floor mat of the type stated that can be inexpensively molded and cured on a flat bed press.

These and other objects of the invention will become apparent from a reading of the following specification and claims, together with the accompanying drawing in which like parts are referred to and indicated by like reference characters and wherein;

Figure 1:
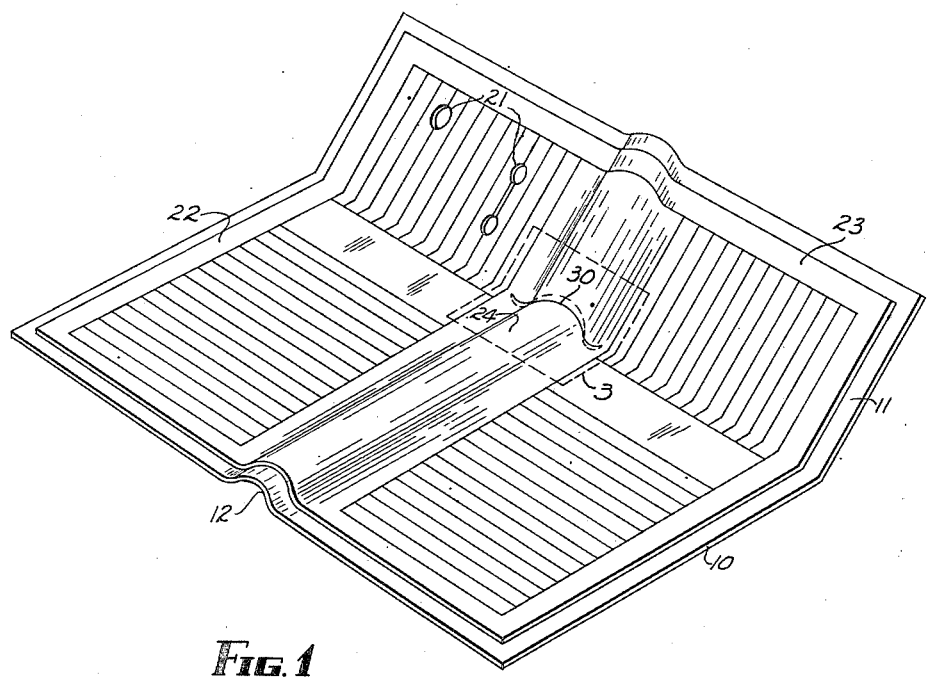
Figure 1 is a perspective view of an automobile floor mat made in accordance with this invention as it appears when installed on a conventional automobile floor.

An automobile floor mat 20 made in accordance with this invention is shown in the Figure 1 as it appears in place on a conventional automobile base or floor 10. The floor 10 has an inclined portion 11 at the motor end and a semicircular ridge or tunnel 12 running longitudinally of its horizontal and inclined portions.

The floor mat 20 is preferably made of flexible tough rubber, although any suitable flexible wear resistant material may be used. The rubber mat is molded and vulcanized in the conventional way on a flat bed press. The mat is made as a flat sheet and no shaping or forming of the mat is attempted. A thick, insulating felt back is then bonded to the rubber mat in the usual manner. An arcuate slot 30 is then die cut into the mat along with the holes 21 for the steering wheel and other operating levers. The slot 30 is located in the ridge covering area 24 of the mat 20 at the junction of the portions 22 and 23 that cover the flat and inclined areas of the floor respectively.

Figure 2:
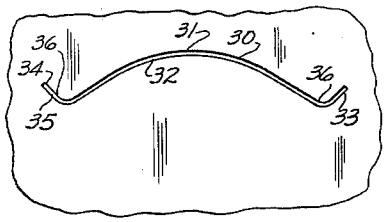
Figure 2 is an enlarged view of a portion of the area designated by the reference character 2 in the Figure 1, showing the arcuate die cut slot as it appears when the floor mat is in its flat uninstalled condition.
Figure 3:
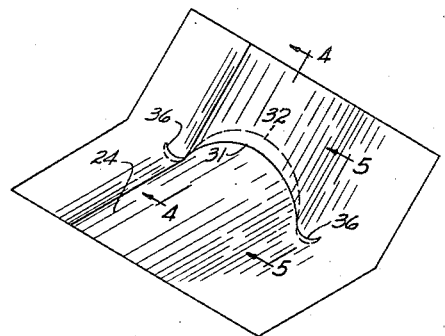
Figure 3 is a perspective view of the installed mat at the intersection of the ridged and the inclined portions, showing the manner in which the concave and convex edges of the slot overlap and underlap.
Figure 4:
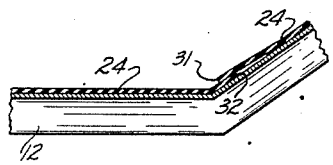
Figure 4 is a longitudinal sectional view thru the center of the slot taken substantially along the line and in the direction of the arrows 4—4 of the Figure 3.

The slot 30, as shown in enlarged form in the Figure 2, has a central arcuate portion terminating in end arcuate portions 33 of reverse curvature. The three portions of the slot cooperating to form the terminal tabs 36.

It has been found by experimentation that the slot 30 should have the shape of the arc intercepted by a central angle of between 83° and 87° on the circumference of a circle having a radius two and one half to three times the height of the top of the ridge 12 above the automobile floor 10.

As will be seen by referring to the Figure 1, the tunnel or ridge 12 is tapered sideways into the plane of the floor and is not a true semicircle which means that the curvature and length of the slot must be adjusted accordingly. The foregoing limits have been found adequate to take care of all the standard makes of automobiles.

Figure 6:
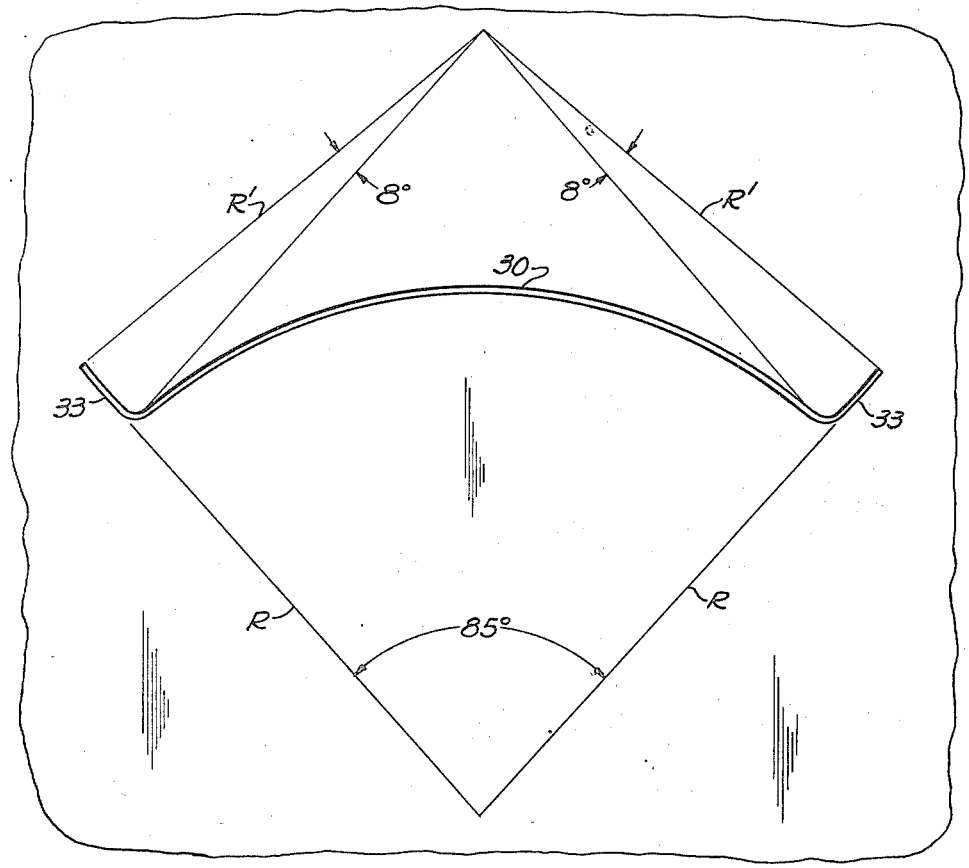
Figure 6 is an enlarged view of that portion of the mat illustrated in Figure 2, indicating the method of determining the curvatures of the arcuate die cut slot.

In the preferred form illustrated in the drawing, the height of the ridge is one inch, therefore the circle of reference has a radius of $1 \times 2.75$ or 2.75 inches and the slot 30 has the curvature and length of an 85° arc on the circumference of such a circle. The slot has terminal reverse curves 33 of the same radii and of a length varying between that of arcs of 6° and 10°. These reverse curves form tabs 36 whose purpose shall be explained hereinafter. Figure 6 of the drawing illustrates the method of determining the main arc of the slot 30 and the reverse curved ends 33. The length of the radii R and R' of the curves 30 and 33 respectively are identical as indicated.

The length of the terminal curves 33 in the case of a mat of average thickness, when used to cover a ridge one inch high, as illustrated, is that of an 8° arc. In case the mat is unusually thick, the basis of determining the length of the arcs 33 is the thickness of the mat. In such cases, the length should not be less than three times the thickness of the mat in order to provide a large enough tab for tucking under.

Figure 5:
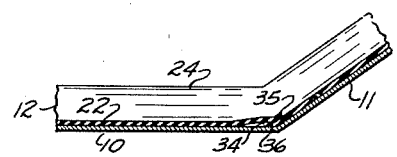
Figure 5 is a longitudinal sectional view thru one of the slot tabs taken substantially along the line and in the direction of the arrows 5—5 of the Figure 3.

The central portion of the slot 30 has a concave edge 31 and a convex edge 32, and the terminal portions have concave edges 34 and convex edges 35, as shown in the Figure 2. When installed, the concave edge 31 of the slot 30 overlies the convex edge 32 and the convex edges 35 overlie the concave edges 34, as shown in the Figures 1, 3, 4 and 5. As shown most clearly in the Figure 5, the tabs 36 tuck under the mat so that the mat hugs the ridge 12 smoothly and without wrinkles as it changes its plane in passing from the horizontal portion of the floor to the inclined portion.

A floor mat made in accordance with this invention is molded in the same manner as a conventional flat mat and requires no more operations in its manufacture than a flat mat. The arcuate slot is die cut as part of the same operation in which the operating lever holes are cut. However, when the parts of the mat adjacent the slot are adjusted as described hereinabove, this mat fits around the ridge in the floor as snugly as the more expensive pre-shaped mat, due to the peculiar configuration of the slot.

It will now be clear that there has been provided a device that accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claims.

I claim:

1. An automobile floor mat of the type adapted for use on a base having a laterally extending inclined portion and a longitudinally extending ridge thereon, consisting of a flexible sheet member having a lateral slot proximate the said inclined and ridged portions, the said member forming at the said slot an underlap and an overlap.

2. An automobile floor mat of the type adapted for use on a base having a laterally extending inclined portion and a longitudinally extending ridge thereon, consisting of a flexible sheet member having a curved lateral slot proximate the said inclined and ridged portions, the said slot forming facing edges, one of the said edges underlying the other edge when the said member is caused to conform with the contour of the aforesaid base.

3. An automobile floor mat of the type adapted for use on a base having a laterally extending inclined portion and a longitudinally extending ridge thereon, consisting of a flexible sheet member having a curved lateral slot proximate the said inclined and ridged portions, the said slot having terminal portions of reversed curvature and forming facing edges, and terminal tabs, one of the said edges underlying the other edge and overlying the said tabs when the said member is caused to conform with the contour of the aforesaid base.

4. An automatic floor mat of the type adapted for use on a base having a laterally extending inclined portion and a longitudinally extending ridge thereon, consisting of a flexible sheet member having an arcuate lateral slot proximate the said inclined and ridged portions, the said slot having the curve of the arc intercepted by a central angle of 85° on the circumference of a circle having a radius 2.75 times the height of the aforesaid ridge and forming facing concave and convex edges, the convex edge underlying the concave edge when the said member is caused to conform with the contour of the aforesaid base.

5. An automobile floor mat of the type adapted for use on a base having a laterally extending inclined portion and a longitudinally extending ridge thereon, consisting of a flexible sheet member having an arcuate lateral slot proximate the said inclined and ridged portions, the said slot having the curve of the arc intercepted by a central angle of between 83° and 87° on the circumference of a circle having a radius 2.5 to 3.0 times the height of the aforesaid ridge and forming facing concave and convex edges, the convex edge underlying the concave edge when the said member is caused to conform with the contour of the aforesaid base.

6. An automobile floor mat of the type adapted for use on a base having a laterally extending inclined portion and a longitudinally extending ridge thereon, consisting of a flexible sheet member having an arcuate lateral slot proximate the said inclined and ridged portions, the said slot having the curve of the arc intercepted by a central angle of 85° on the circumference of a circle having a radius 2.75 times the height of the aforesaid ridge and terminating in reverse arcs of 8° and similar radii, and forming facing concave and convex edges, the convex edge of the 85° arc portion underlying its matching concave edge and the convex edges of the 8° arc portions overlying their matching concave edges when the said member is caused to conform to the contour of the aforesaid base.

7. An automobile floor mat of the type adapted for use on a base having a laterally extending inclined portion and a longitudinally extending ridge thereon, consisting of a flexible sheet member having an arcuate lateral slot proximate the said inclined and ridged portions, the said slot having the curve of the arc intercepted by a central angle varying between 83° and 87° on the circumference of a circle having a radius 2.5 to 3.0 times the height of the aforesaid ridge and terminating in reverse arcs of 6° to 10° and similar radii, and forming facing concave and convex edges, the convex edge of the 83° to 87° arc portion underlying its matching concave edge, and the convex edges of the 6° to 10° arc portions overlying their matching concave edges when the said member is caused to conform to the contour of the aforesaid base.

8. An automobile floor mat of the type adapted for use on a base having a laterally extending inclined portion and a longitudinally extending ridge thereon, consisting of a flexible sheet member having an arcuate lateral slot proximate the said inclined and ridged portions, the said slot having the curve of the arc intercepted by a central angle varying between 83° and 87° on the circumference of a circle having a radius 2.5 to 3.0 times the height of the aforesaid ridge and terminating in reverse arcs of similar radii and of a length not less than three times the thickness of the said member, and forming facing concave and convex edges, the convex edge of the 83° to 87° arc portion underlying its matching concave edge, and the convex edges of the terminal arcs overlying their matching concave edges when the said member is caused to conform to the contour of the aforesaid base.

9. An automobile floor mat of the type adapted for use on a base having a laterally extending inclined portion and a longitudinally extending ridge thereon, comprising in combination, a flexible sheet member and a curved slot extending transversely of the sheet member proximate the aforesaid inclined and ridged portions, the said slot having terminal portions of reversed curvature and forming facing edges, and terminal tabs, one of the said edges underlying the other edge and overlying the said tabs when the said sheet member is caused to conform with the contour of the aforesaid base.

10. An automobile floor mat of the type adapted for use on a base having a laterally extending inclined portion and a longitudinally extending ridge thereon, comprising in combination, a flexible sheet member and a curved slot extending transversely of the sheet member proximate the aforesaid inclined and ridged portions, the said slot having the curve of the arc intercepted by a central angle varying between 83° and 87° on the circumference of a circle having a radius 2.5 to 3.0 times the height of the aforesaid ridge and terminating in reverse arcs of 6° to 10° and similar radii, and forming facing concave and convex edges, the convex edge of the 83° to 87° arc portion underlying its matching concave edge, and the convex edges of the 6° to 10° arc portions overlying their matching concave edges when the said sheet member is caused to conform to the contour of the aforesaid base.

BEN. KRAVITZ.

REFERENCES CITED

The following references are of record in the file of this patent:

UNITED STATES PATENTS

| Number | Name | Date |
| --- | --- | --- |
| 224,874 | Johnstone | Feb. 24, 1880 |
| 1,994,145 | Moule | Mar. 12, 1935 |
| 2,258,238 | Collins | Oct. 7, 1941 |

OTHER REFERENCES

"Short Patterns Kinks and Quick Methods for Sheet Metal Workers," pages 51 and 84, by William Neubecker.